United States Patent
Kalentics et al.

(10) Patent No.: US 10,596,661 B2
(45) Date of Patent: Mar. 24, 2020

(54) METHOD AND DEVICE FOR IMPLEMENTING LASER SHOCK PEENING OR WARM LASER SHOCK PEENING DURING SELECTIVE LASER MELTING

(71) Applicant: ECOLE POLYTECHNIQUE FEDERALE DE LAUSANNE (EPFL), Lausanne (CH)

(72) Inventors: Nikola Kalentics, Lausanne (CH); Roland Logé, Lausanne (CH); Eric Boillat, Crissier (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 584 days.

(21) Appl. No.: 15/278,044

(22) Filed: Sep. 28, 2016

(65) Prior Publication Data

US 2017/0087670 A1    Mar. 30, 2017

(30) Foreign Application Priority Data

Sep. 28, 2015  (EP) ..................................... 15187188
Mar. 23, 2016  (EP) ..................................... 16162065

(51) Int. Cl.
*B23K 26/342* (2014.01)
*B33Y 10/00* (2015.01)
(Continued)

(52) U.S. Cl.
CPC .......... *B23K 26/342* (2015.10); *B22F 3/1055* (2013.01); *B23K 26/009* (2013.01);
(Continued)

(58) Field of Classification Search
None
See application file for complete search history.

(56) References Cited

U.S. PATENT DOCUMENTS

| 4,122,240 A | * | 10/1978 | Banas ...................... C21D 1/09 428/655 |
| 5,316,720 A | | 5/1994 | Spiegel et al. |

(Continued)

FOREIGN PATENT DOCUMENTS

| DE | 102009051551 A1 | 5/2011 |
| EP | 2489458 A1 | 8/2012 |

(Continued)

OTHER PUBLICATIONS

"Selective Laser Melting," Apr. 14, 2015, Wikipedia article.

(Continued)

*Primary Examiner* — Geoffrey S Evans
(74) *Attorney, Agent, or Firm* — Andre Roland S.A.; Nikolaus Schibli

(57) ABSTRACT

A method for manufacturing an object including the steps of forming layers by adding successive layers of material to form the object by selective laser melting (SLM), and inducing plastic deformation and residual stress into solidified material of at least one of the successive layers of material to improve mechanical properties and a fatigue resistance of the object, wherein the plastic deformation and the residual stress are induced by a laser.

18 Claims, 6 Drawing Sheets

(51) Int. Cl.
| | |
|---|---|
| *B23K 26/356* | (2014.01) |
| *B22F 3/105* | (2006.01) |
| *B29C 64/20* | (2017.01) |
| *B29C 64/153* | (2017.01) |
| *B33Y 30/00* | (2015.01) |
| *B33Y 40/00* | (2020.01) |
| *B23K 26/00* | (2014.01) |
| *C21D 10/00* | (2006.01) |
| *C21D 1/38* | (2006.01) |
| *C21D 7/06* | (2006.01) |

(52) U.S. Cl.
CPC .......... *B23K 26/356* (2015.10); *B29C 64/153* (2017.08); *B29C 64/20* (2017.08); *B33Y 10/00* (2014.12); *B33Y 30/00* (2014.12); *B33Y 40/00* (2014.12); *C21D 10/005* (2013.01); *B22F 2003/1056* (2013.01); *C21D 1/38* (2013.01); *C21D 7/06* (2013.01); *Y02P 10/295* (2015.11)

(56) References Cited

U.S. PATENT DOCUMENTS

| | | | | |
|---|---|---|---|---|
| 5,674,328 | A * | 10/1997 | Mannava | C21D 10/005 148/525 |
| 5,744,781 | A * | 4/1998 | Yeaton | B23K 26/3576 219/121.84 |
| 6,057,003 | A * | 5/2000 | Dulaney | B05D 3/06 427/331 |
| 6,084,202 | A * | 7/2000 | Okazaki | B23K 26/0608 219/121.61 |
| 6,091,749 | A * | 7/2000 | Hoffmaster | H01S 5/0683 372/25 |
| 6,519,500 | B1 | 2/2003 | White | |
| 6,923,877 | B1 * | 8/2005 | Anderson | B23K 26/18 118/620 |
| 9,901,983 | B2 | 2/2018 | Hovel et al. | |
| 2003/0029522 | A1 * | 2/2003 | Moreman, III | C21D 10/005 148/224 |
| 2006/0124619 | A1 * | 6/2006 | Mannava | C21D 10/005 219/121.85 |
| 2007/0075062 | A1 * | 4/2007 | Hackel | B23K 26/18 219/121.85 |
| 2007/0122560 | A1 | 5/2007 | Adams | |
| 2011/0253690 | A1 * | 10/2011 | Dane | G02B 27/0927 219/121.74 |
| 2011/0259862 | A1 * | 10/2011 | Scott | B23K 26/703 219/121.73 |
| 2013/0064706 | A1 * | 3/2013 | Schwarze | B22F 3/1055 419/1 |
| 2013/0108726 | A1 * | 5/2013 | Uckelmann | B29C 67/0007 425/174.4 |
| 2013/0180969 | A1 * | 7/2013 | Cheng | B23K 26/356 219/121.85 |
| 2014/0255198 | A1 * | 9/2014 | El-Wardany | B22F 5/009 416/229 A |
| 2014/0367894 | A1 * | 12/2014 | Kramer | B33Y 10/00 264/482 |
| 2015/0224743 | A1 | 8/2015 | Schick et al. | |
| 2015/0266285 | A1 * | 9/2015 | James | B33Y 40/00 419/28 |
| 2015/0306665 | A1 * | 10/2015 | Sidhu | B22F 3/1055 427/540 |
| 2016/0074965 | A1 * | 3/2016 | Jakimov | B29C 64/153 219/76.12 |
| 2016/0107263 | A1 * | 4/2016 | Koerber | B22F 3/1055 219/76.12 |
| 2016/0136759 | A1 * | 5/2016 | Broda | B22F 3/1055 219/76.1 |
| 2016/0214211 | A1 * | 7/2016 | Gregg | B22F 3/11 |
| 2018/0361509 | A1 * | 12/2018 | Reznik | B23K 26/354 |

FOREIGN PATENT DOCUMENTS

| | | |
|---|---|---|
| EP | 2735700 A2 | 5/2014 |
| WO | WO2007140537 A1 | 12/2007 |
| WO | WO2013140147 A1 | 9/2013 |

OTHER PUBLICATIONS

Communication 94(3) of Feb. 14, 2018 of EP16191015.3.
Gujba, Abdullahi K., and Mamoun Medraj. "Laser peening process and its impact on materials properties in comparison with shot peening and ultrasonic impact peening." Materials 7.12 (2014): 7925-7974.
Anonymous, Laser Peening, Wikipedia, May 22, 2015, p. 1-10.
European Search Report dated Jan. 27, 2017 for EP 16191015.3.
International Search Report dated May 3, 2017 from PCT/EP2016/081639.
Majumdar, J. D., & Manna, I. (2003). Laser processing of materials. Sadhana, 28(3-4), 495-562.
Written Opinion of the European Search Authority dated Jan. 27, 2017 of EP 16191015.3.
Written Opinion of the International Search Authority dated May 3, 2017 from PCT/EP2016/081639.

* cited by examiner

METHOD AND DEVICE FOR IMPLEMENTING LASER SHOCK PEENING OR WARM LASER SHOCK PEENING DURING SELECTIVE LASER MELTING

CROSS-REFERENCE TO RELATED APPLICATIONS

The present application claims foreign priority to earlier European patent application Nos. EP15187188.6 filed on Sep. 28, 2015 and EP 16162065.3 filed on Mar. 23, 2016, the content of these earlier applications being incorporated by reference in their entirety in the present application.

BACKGROUND ART

Selective Laser Melting (SLM, shown in FIG. 1), also known as Direct Metal Laser Sintering (DMLS), Laser Cusing or Selective Laser Sintering (SLS) is an Additive Manufacturing process in which parts are built layer by layer out of a metallic, ceramic or polymer powder.

FIG. 1 illustrates a standard SLM process of the background art. At each step of the process, a powder bed is deposited on a substrate and selectively melted by a laser beam 1 piloted by a CAM system through a scanning head 2. After solidification, the material gets consolidated, a building platform 3 is lowered for the value of the wanted layer height and a new powder layer is deposited by the deposition system 4 containing fresh powder 5. The operation sequence is repeated until completion of the part 6. At the end the unused powder 7 is removed and recycled.

Some of the biggest limitations of parts built by the SLM technology are their inadequate mechanical properties compared to conventionally produced parts. These limitations are well studied and are the result of unfavorable tensile residual stresses (TRS), increased surface roughness, and lower part density. This results in a need for subsequent thermal/mechanical treatment which is limiting the SLM process application.

Another method is disclosed in U.S. Pat. No. 5,316,720. In this patent, a process is disclosed that is used for the compaction and densification of discrete powder materials utilizing a high amplitude stress wave which produces a high pressure condition at a surface of the particles. More specifically, with this process, to manufacture a product, subsequent layers are built up one at a time, first by adding a powder to the surface and then laser shocking the surface and after the particles in each layer have been added, the article made is subjected to sintering to force the added material into tight union with the various surfaces to be bonded.

However, despite these applications in the field of SLM, strongly improved processes are desired to improve device characteristics and manufacturing methods.

SUMMARY

An aim of the present invention is thus to improve the known processes and devices. A further aim of the present invention is to propose a method using SLM allowing the construction of parts with improved characteristics.

In one embodiment, the invention concerns a method for manufacturing an object by selective laser melting (SLM) in which successive layers of material are added to form the object, wherein between the forming of said subsequent layers of the object, a plastic deformation and residual stresses are induced into the solidified material of at least one of said layers to improve the mechanical properties and the fatigue resistance of the object, wherein said plastic deformation and residual stresses are induced by a laser. Preferably, the plastic deformation and residual stresses are induced by a Laser Shock Peening (LSP) step or by a Warm Laser Shock Peening (WLSP) step.

In embodiments of the invention, the layers or parts of a layer made with the SLM process are treated with multiple LSP or WLSP treatments. The lasers used for the SLM and the LSP or WLSP steps may be different lasers or the same laser, working in two different modes.

In some embodiments, a same scanning head or different scanning heads are used for the SLM and the LSP or WLSP steps.

In one embodiment, a horizontal 2-axes motion is used for the guiding of the laser used for the LSP or WLSP step instead of a scanning head. In another embodiment, a mirror with a tilting motion can be used for guiding the laser used for LSP or WLSP.

In one embodiment, the treatment steps are followed by an optional selective (in situ) heat treatment.

In one embodiment, the selective heat treatment is made by a laser, an infrared lamp or a substrate preheating.

In one embodiment, a device is placed over at least a portion of said solidified material. This device comprises a confining and/or ablative layer. The confining layer is transparent to the laser beam and is applied to maximize the shock wave pressure and preventing it to rapidly expand from the surface of the material, thus increasing the depth of shockwave penetration. The ablative layer is used to avoid material ablation and is preferably made out of an opaque material.

In one embodiment, the invention concerns a system to carry out the method as described herein, said system may comprise a first laser, a scanning head, a powder deposition system containing fresh powder, a platform on which a part is built by a selective laser melting (SLM) process realized by the first laser. The system also may comprise of a second laser, a confining layer transparent to laser and an ablative layer for applying a laser shock peening (LSP) step to the part being built.

In one embodiment, the ablative layer is a liquid layer or a solid layer.

In one embodiment, the system further comprises a heating unit to heat the part being built.

In one embodiment, the confining layer is made of two layers, where one can be treated as a consumable and is exchanged. Preferably but not exclusively, the exchangeable layer is a top part of the ablative layer.

In another embodiment, the second confining layer is the top part of an ablative layer, and is brought on a roll.

In one embodiment, the first laser and the second laser are the same laser device working in two different modes, at the same or different wavelengths.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images are simplified for illustration purposes and may not be depicted to scale.

DETAILED DESCRIPTION OF THE SEVERAL EMBODIMENTS

Figure 1:
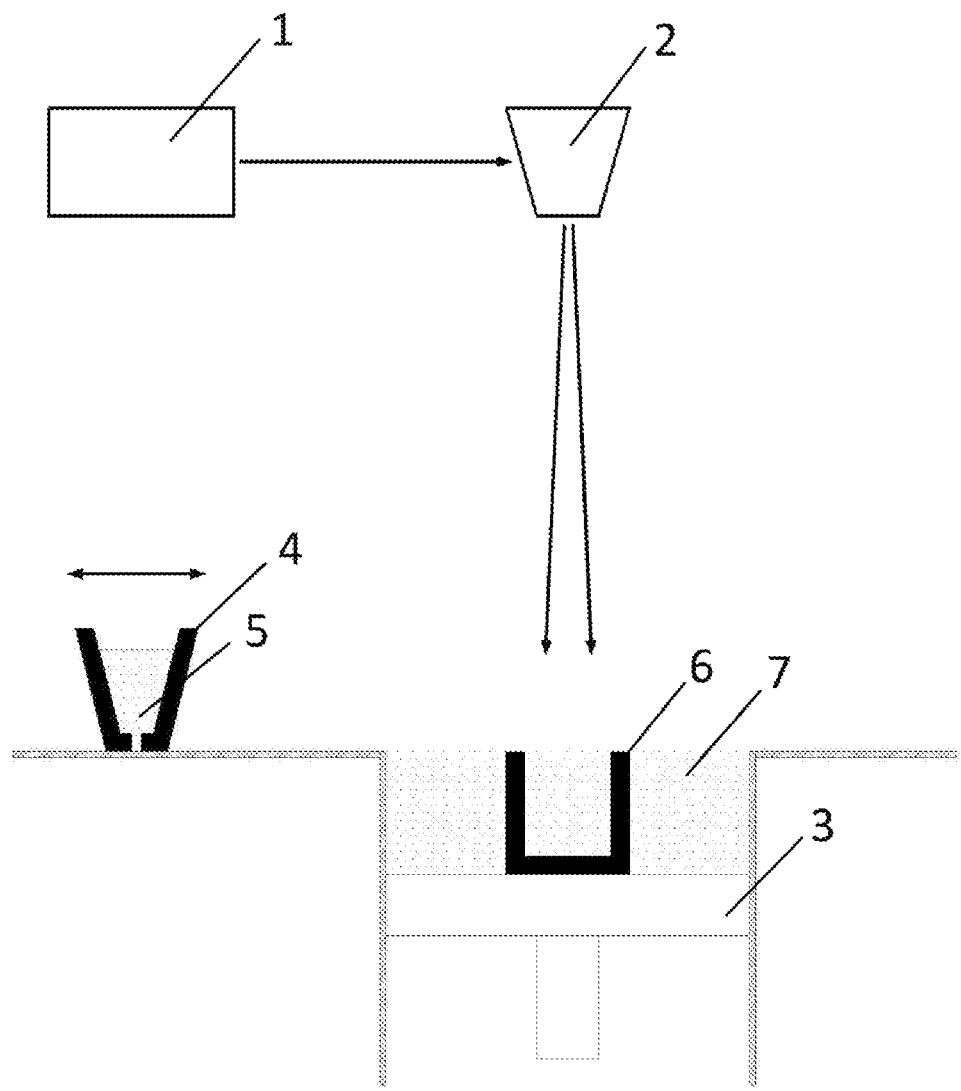
FIG. 1 a schematical illustration of a system according to the background art.

A first idea of the present invention is to provide a device and a method for introducing Laser shock Peening (LSP) or Warm Laser Shock Peening (WLSP) during Selective Laser Melting (SLM) in order to change the residual stress field from a detrimental tensile residual stress (TRS) which is inherited from the SLM process, to a beneficial compressive residual stress (CRS) field in chosen critical zones, for example in the near surface region. This is resulting in improved mechanical properties and fatigue life of the part or article 6 (in situ) directly while it is being built and eliminates or at least reduces the need for post processing.

This approach leads to improvements of mechanical properties of the finished part 6 in much larger depths than with conventional post processing techniques. This effect is due to the use of LSP or WLSP throughout the volume of the part 6 while it is being built, instead of just as a surface treatment of a finished part 6. With such an approach, the depth of the CRS field and the hardened area is not limited just to a shallow layer beneath the surface of the treated part 6, but can be largely increased or even designed throughout the bulk of the material thus addressing all the key sections of its complex geometry. After building a certain number of layers by means of a SLM process a (high energy) pulsed laser (LSP or WLSP) is used to induce plastic deformation to the material and improve mechanical properties and change the residual stress profile of the part 6 that is being built. This can be obtained by using a laser in a pulsed mode described below, a heating unit described below, and a device described below, and by creating a high pressure shock wave at a surface of a previously consolidated layer. This generates compressive residual stress in the surface of the material. The number of SLM layers after which the LSP or WLSP is applied is dependent on the desired volume and the depth of penetration of CRS field and hardening that we want to introduce to the given material. Also, for some crucial layers, multiple LSP or WLSP treatments of the same SLM layer or part of a layer are also possible. In such cases, the ablative layer should be replaced accordingly.

One of the goals of the present invention is therefore to provide an effective and economical method of improving mechanical properties, increasing fatigue life and part density and decreasing surface roughness of parts 6 built by SLM during the building process itself. These improvements are made throughout the volume of the part 6, by using Laser Shock Peening or Warm Laser Shock Peening during the SLM process. This gives the advantage of changing the residual stress field from the detrimental TRS to a beneficial CRS, introducing these changes and hardening the material in much larger depths compared to LSP/WLSP as a surface treatment. It also gives a possibility to selectively treat critical sections of the produced part. This is very important for parts 6 that have internal voids, lattice structure or some other complex geometries, which are very often produced by the SLM process.

This goal is achieved by providing a method and a device for introducing Laser Shock Peening (LSP) or Warm Laser Shock Peening (WLSP) during the Selective Laser Melting (SLM) process.

Laser Shock Peening (LSP), also known as Laser Shock Processing, Laser Shot Peening or Laser Peening is a surface treatment process used to improve surface integrity which significantly impacts component performance and increases its fatigue resistance and this principle is used in another embodiment of the present invention. During the LSP process a pulsed laser is used to produce shock waves near the surface of the material. The surface of the material is confined with a liquid confining layer, which increases the pressure of the shock wave. The pressure of a confined shock wave is on the order of a few GPa and can be much larger than the dynamic yield strength of the sample material. Once the peak pressure exceeds the material yield strength, the shock wave pressure causes plastic deformation and compressive residual stresses. Due to the plastic deformation the treated material undergoes high strain rates (up to $10^6$ s$^{-1}$) which results in the introduction of a CRS field which is linked to the enhanced material properties and increased fatigue life and hardness at the surface and in the subsurface. The CRS field can reach a depth of several millimeters and influence wear and corrosion resistance.

Warm Laser Shock Peening (WLSP), also known as Warm (or Thermal, Thermally engineered) Laser Shock Processing, Warm Laser Shot Peening or Warm Laser Peening is a surface treatment process similar to LSP, used with the same goals of increasing performance and fatigue life of the treated part. During the WLSP process, parts are heated and maintained at a temperature usually below 350° C., but this depends on the material. In addition to the LSP effects, by heating the material up to these temperatures (about 200° C. is often enough to avoid material relaxation), dynamic strain aging and dynamic precipitation occur in some materials during the WLSP process. This increases the introduced dislocation density, the penetration depth of the shockwaves, and the CRS field and plastic deformation depth, but more importantly, it is increasing the stability of the CRS at high temperature and under cyclic loading conditions.

Figure 4:
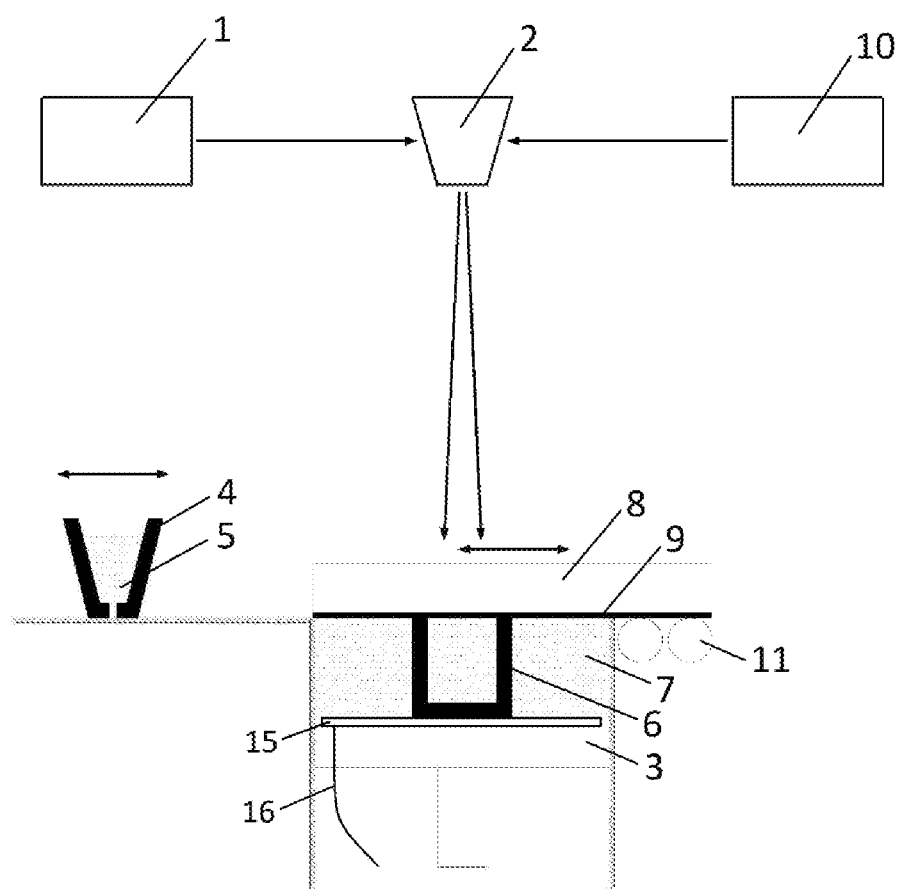
FIG. 4 a schematical illustration of a system according to an embodiment of the invention.
Figure 5:
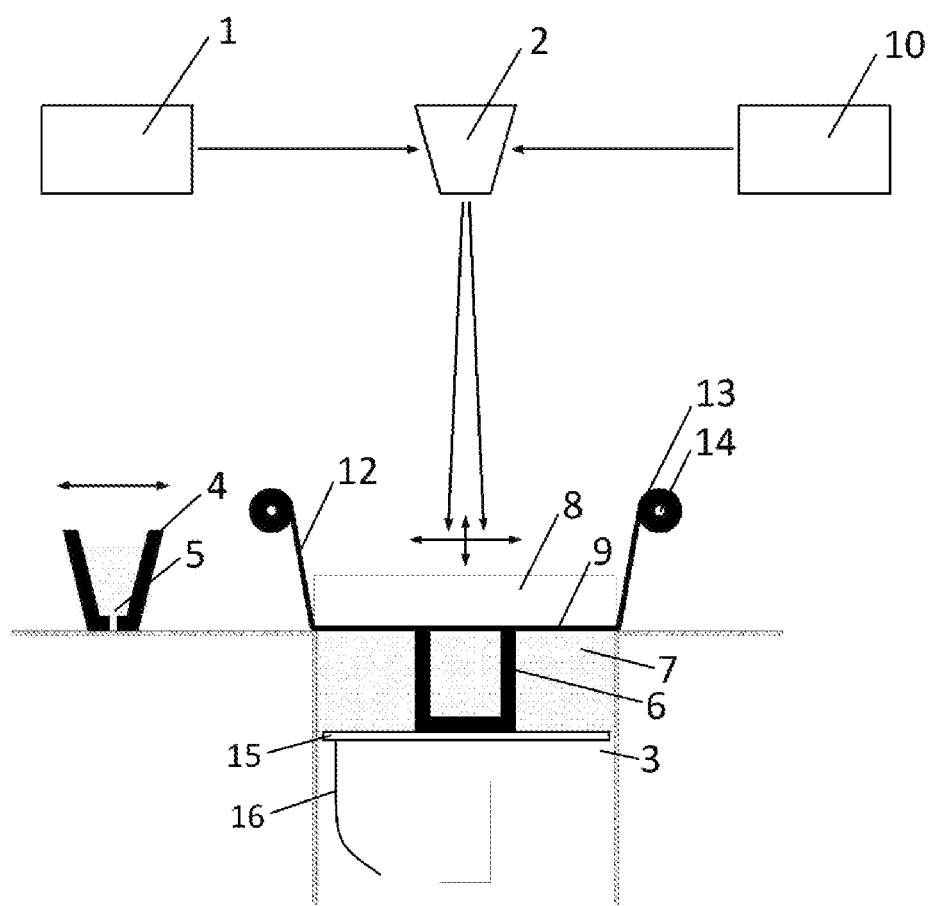
FIG. 5 a schematical illustration of a system according to an embodiment of the invention.

Standard WLSP as a surface treatment method uses high vaporization temperature liquids as the confining layer on the surface of the material to increase the created pressures. Because the treated parts usually have a complex geometry, liquids are used because they can easily conformally confine such geometries. In herein described application, liquids cannot be used, because they would contaminate the powder of the SLM process. This is the reason why a device with a solid state confining layer was devised. In order to be able to have a functional combination of Warm Laser Shock Peening (WLSP) during the Selective Laser Melting (SLM) process, combined with an optional in situ heat treatment methods and devices as described herein and illustrated in FIGS. 4 and 5 are implemented.

In one embodiment, in order to be able to have a functional combination of LSP/WLSP during the Selective Laser Melting (SLM) process, combined with an optional heat treatment methods and devices are described herein and illustrated in FIGS. 2 to 6.

After a certain number of layers are built by the traditional SLM process (see the background discussion above and FIG. 1) using a laser 1 in a continuous mode, the device according to one aspect of the present invention is activated 8, 9 and the LSP/WLSP process is applied introducing plastic deformation to the material (see for example FIGS. 2-6) forming the part 6. Optionally, for the WSLP process the part 6 is heated with heating unit 15, 16 (see for example FIGS. 4, 5). This results in better surface quality, higher part density and improved mechanical properties of the finished part 6 compared to parts made by a standard SLM process. For the LSP/WSLP process a second laser 10 in a pulsed mode is preferably used. Depending on the energy of this second laser 10, it can be guided by the same scanning head 2 or a different one or other equivalent suitable guiding means. For example, in another embodiment, due to the significantly slower scanning speed of the second laser 10, simple guiding solutions can be proposed. For example, it can be guided with a horizontal 2-axes motion, a robot arm mounted at the top of the building chamber, or a mirror with a tilting motion. These and other equivalent solutions may also be easily implemented in both embodiments (LSP and WLSP processes). For example, instead of using two different lasers 1, 10, with further development of laser technology, preferably the same laser 1 may be used in two modes (continuous mode for the SLM and a pulsed mode for LSP). After applying the LSP/WLSP process the device is moved to its starting position and an optional in situ additional heat treatment may be carried out. The deposition system 4 is then activated and deposits a fresh layer of powder 5. During this period, a new ablative layer 9, is introduced to the device so that it is ready for its next application. The device is brought into position either as a single platform or as a part of the standard SLM deposition system. This approach of the platform can be achieved in a vertical and/or in a horizontal direction. The horizontal movement can be either in the direction of the deposition system or perpendicular to it. The said device and the previously solidified layer of the part being built by the SLM process can be in direct contact or there can be a certain gap between them. By changing the value of the gap distance, one is able to fine tune the intensity of the shock waves that are being introduced to the surface of the material.

After the LSP/WLSP process, optionally a subsequent in situ heating step may be used to selectively heat treat the hardened material. This heating step is preferably done with the laser in a continuous mode but with reduced power compared to the SLM process. In another embodiment, infrared heating can be used, or even heating of the part with the heater used for WLSP but going to a higher temperature.

The heating unit used for heating of the part 6 during the WLSP treatment comprises a heating plate 15 and a power cord 16 and it can be placed below the part 6 that is being made as illustrated in FIGS. 4 and 5. In another embodiment, an infrared heating unit can be used to heat the top surface of the part 6. Also, another possibility would be to use the existing or a different laser 1, 10 with possibly a larger spot size to heat the material from the top. In another embodiment, depending on the material that is being processed, the heating unit is not used at all, limiting the deformation process to room temperature Laser Shock Peening (LSP).

Figure 2:
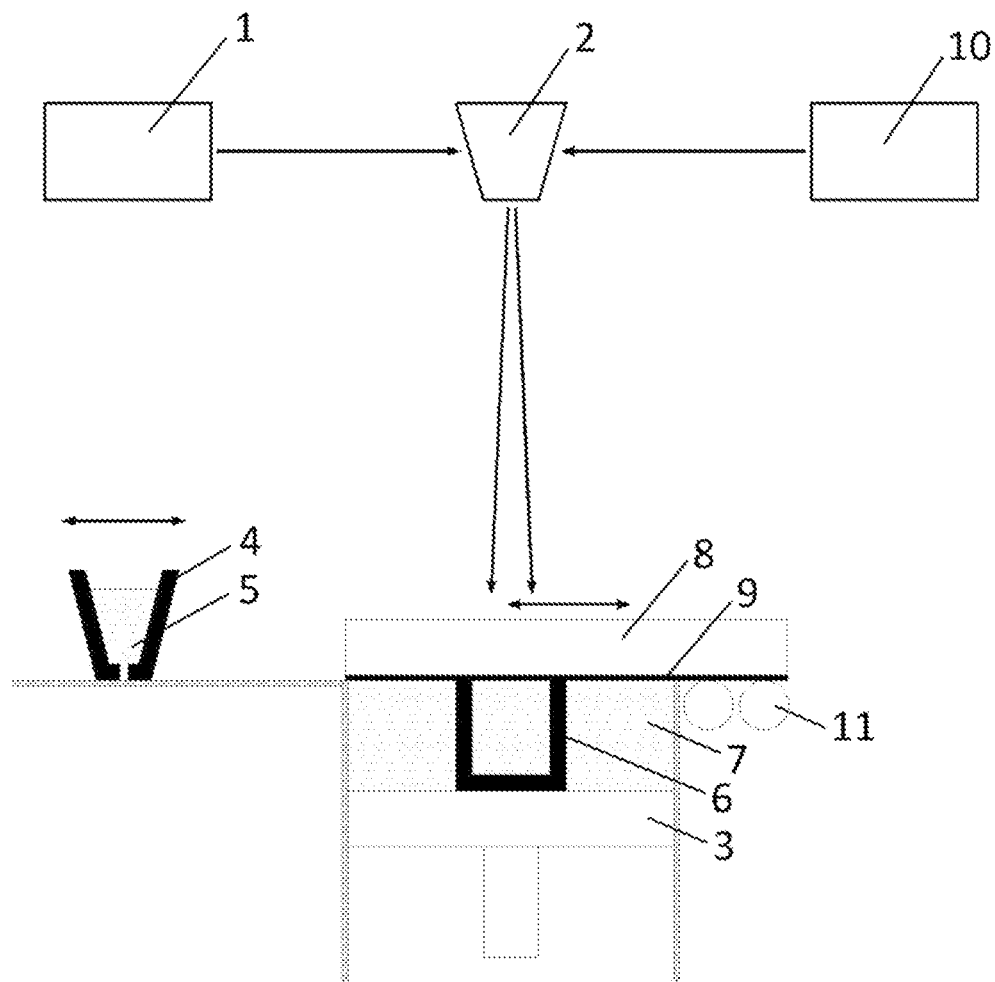
FIG. 2 a schematical illustration of a system according to an embodiment of the invention.
Figure 3:
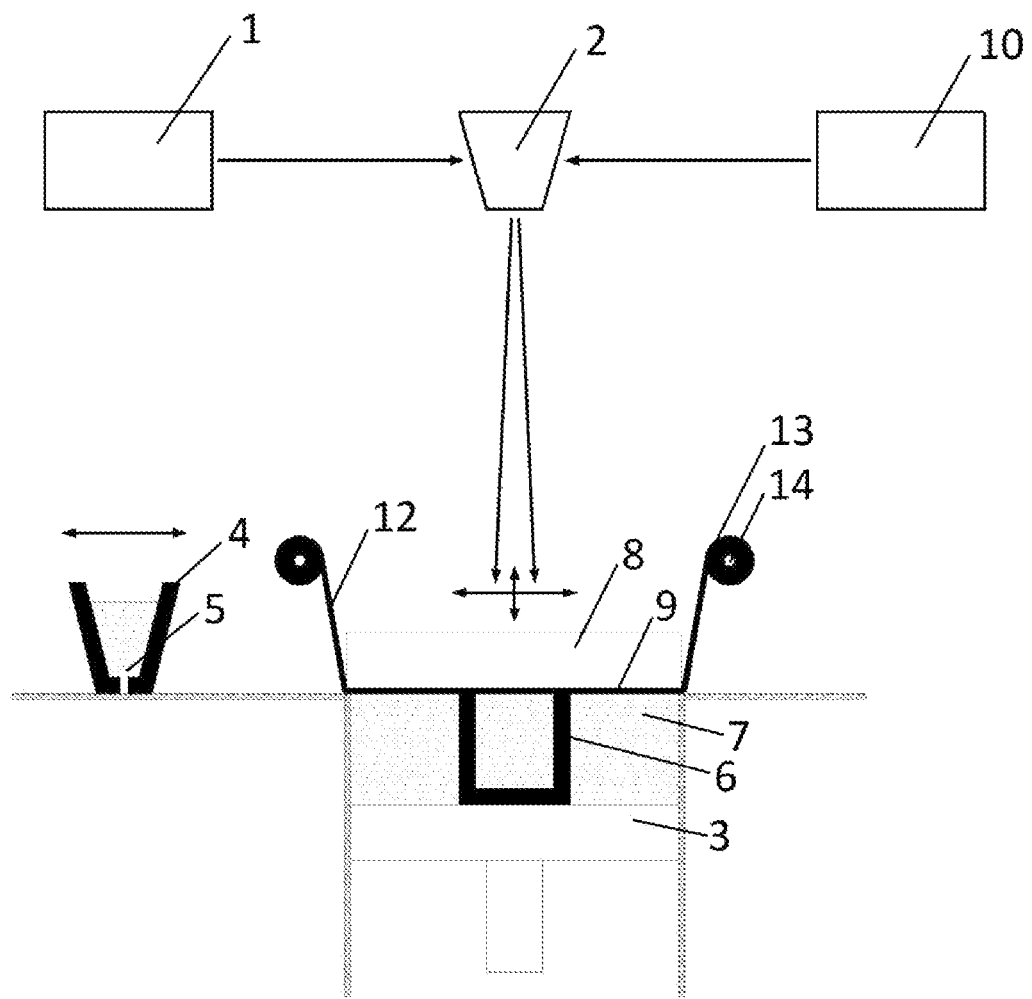
FIG. 3 a schematical illustration of a system according to an embodiment of the invention.

An embodiment of a device according to the invention is illustrated in FIGS. 2 to 6 comprises at least a confining layer 8 (8A and 8B) and/or an ablative layer 9 in addition to the elements already identified in FIG. 1. The differences in design of the device in FIGS. 2 and 4 compared to FIGS. 3 and 5 is the state of the medium that is applied for the ablative layer 9. It can be either in a liquid (FIGS. 2, 4) or a solid state (FIGS. 3, 5).

Figure 6:
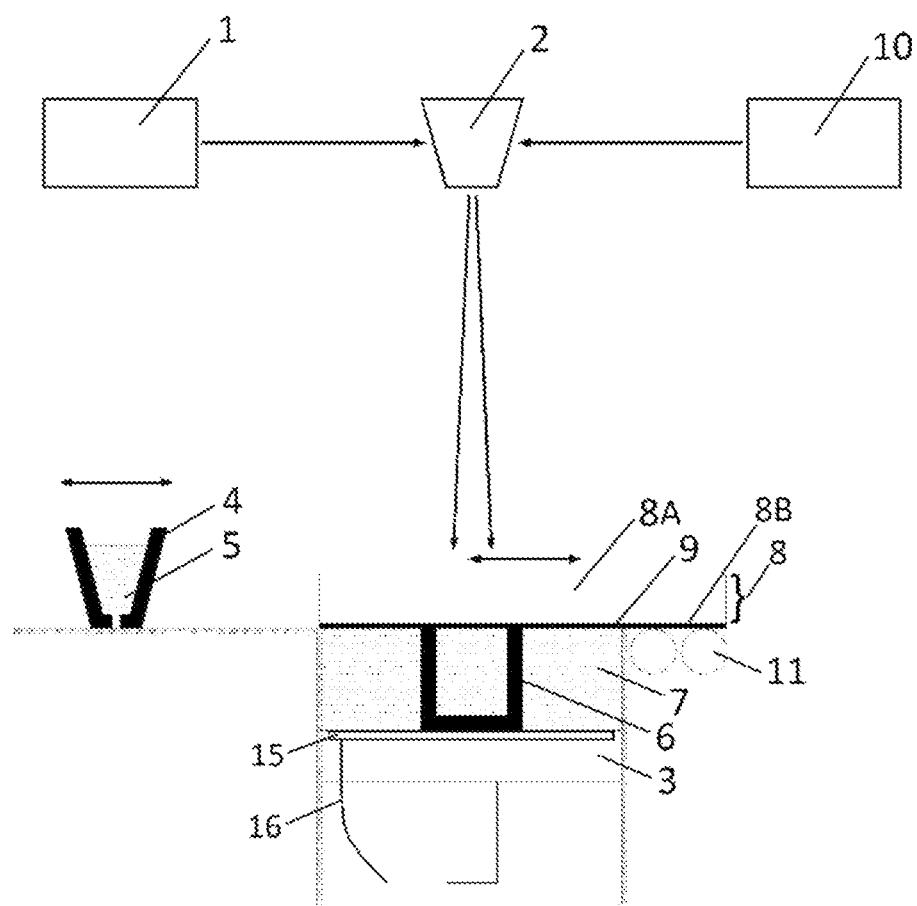
FIG. 6 a schematical illustration of a system according to an embodiment of the invention.

Embodiments of a device according to the some aspects of the present invention using the WLSP process are illustrated in FIGS. 4 and 5, 6. and may comprise a confining layer 8 (8A and 8B) and an ablative layer 9. The differences in design of the device in FIGS. 4 and 5 (as for FIGS. 2 and 3) is the state of the medium that is applied for the ablative layer. It can be either in a liquid (as shown in FIG. 4) or a solid state (as shown in FIG. 5).

The system according to this embodiment has the following beneficial effects: (1) Maximizing generated shock wave pressure, (2) avoiding ablation of the surface of the consolidated layer, (3) minimizing powder bed dispersion, and (4) possibility to target specific 3D regions of the part/article being built, for example where potential weaknesses may be present or where high stress may build when using the part.

In an embodiment, a solid state confining layer 8 (8A and 8B) that is transparent to the laser beam is applied to maximize the shock wave pressure and prevent it from rapidly expanding away from the surface. By directing the shock waves to the surface of the material the confining layer 8/8A/8B is increasing the depth of shock wave penetration. Due to the generation of high pressure waves close to the powder bed surface, powder dispersion should be addressed. This is another important role of the confining layer 8/8A/8B as it may serve also as a protective layer for the non-solidified powder 7. Different solid state materials may be applied in accordance with some aspects of the present invention, but they should not interfere with the laser beam or contaminate the powder 7 (as liquids would). These materials include for example quartz, different types of glass, for example but not limited to quartz glass, Pb glass, glass (K7), and K9 glass, Perspex, silicon rubber, sodium silicate, fused silica, potassium chloride, sodium chloride, polyethylene, fluoroplastic (nitrocellulose or mixture thereof), PETN (pentaerythritol tetranitrate), bismuth, lead, cadmium, tin, zinc. Depending on the material that is being used and the process temperature, a confining layer 8/8A/8B may have cooling channels. The cooling medium (water, gases) should also be transparent and not interfering with the laser beam.

Other equivalent materials may be envisaged as confining layer 8, 8A/8B, and the list given herein is only a non-limiting example of possible materials which have the necessary properties, for example a solid material that does not interfere with the laser beam.

As a consequence of the high pressure shockwaves, breakdown and permanent damage to the solid state confining layer 8 may be caused and present an issue. To avoid these problems, in a different embodiment, the confining layer 8 comprises two layers 8A and 8B, see FIG. 6 (this principle being application to all embodiments described herein). Both layers 8A and 8B are transparent to the laser beam, but only the bottom layer—8B is influenced by the shockwaves and is used as an expendable (i.e. consumable) layer. After certain number of shots, as the layer 8B starts to deteriorate, it is automatically replaced. Some of the possible materials for this layer may be, similarly as described above, transparent polymer foil, tape, layered quartz and others. In a different embodiment, where a solid ablative medium is used (similarly as in FIGS. 3 and 5), expendable layer 8B may be a top part of the ablative layer 9, that is introduced on a coil 13. In such a case, the coil may comprise only two layers bonded together, a top, laser-transparent confining layer 8B, and a bottom ablative layer 9 that is not transparent to the laser beam. In a different embodiment, these two layers 8B and 9, may be brought to the device from two separate rolls In another embodiment, if the power of the laser that is being used is sufficiently low, the top part of the confining layer 8A might be redundant and such an embodiment would have only a combination of a bonded expendable confining layer 8B and an ablative layer 9, that would be brought to the system either separately, or as a combination of a bonded expendable confining layer 8B and an ablative layer 9, introduced on a single coil 13. Some embodiments of the invention and materials suggested for the confining/ablative layer 8/8A/8B/9 of the device in the present application are only illustrative examples and should not be construed in a limiting manner.

The ablative layer 9 has the beneficial effect of preventing ablation of the surface of the material and has a direct effect on the induced residual stresses. Ablative layer can be made of an opaque material. Although LSP/WLSP without this layer is still possible, the induced compressive residual stresses in the material may not be effective or significant enough. The reason for this ineffectiveness is that a large amount of the peening intensity is reduced without the ablative layer 9/12. This layer 9/12 may be made of paint, for example but not limited to black paint, Al based paint, (vinyl, aluminum) tape, adhesive, for example but not limited to Al adhesive, metallic coatings (Al, Ta, Mo, Cu—5 um), foil Al, Ta, Mo, Cu, Zn, Tn, Pb, etc. depending on the material that is being processed. Other materials may be used for this layer 9 and preferentially they should have a high absorption of the laser beam. Accordingly, other equivalent materials may be envisaged as ablative layer 9, and the list given herein is only a non-limiting example of possible materials which have the necessary properties, for example a material that absorbs the laser beam.

The method of applying an ablative layer 9 to the bottom of a confining layer is different based on the material of the ablative layer 9 itself. There are at least two possible designs (as illustrated in FIGS. 2, 3, 4 and 5), but in all cases the device must have such motions that before each LSP/WLSP sequence there is a fresh ablative layer 9 under the confining layer 8. Based on the different directions of approach, they can be vertical or horizontal, of the device itself, the coating system is modified in accordance.

Next, examples of methods of applying an ablative layer are discussed. First, for the liquid (paint and adhesive) ablative layer 9, a coating system is used as illustrated in FIGS. 2 and 4. The medium to form the liquid ablative layer is brought through the rollers 11 to the bottom surface of the confining layer 8 and applied in a thin layer and solidified. After the layer has been peened (LSPed/WLSPed), the device is moved to a side so that the SLM process or heat treatment can continue. During this time a fresh ablative layer is re-applied to the device. The number of rollers 11 can vary, depending on the viscosity of the ablative medium. There may be multiple rollers 11 that are adding the ablative medium, but also a roller/wiper 11 used to remove the excess material. In an alternative embodiment, a similar way of applying the ablative medium can be designed with a system of sprinklers, brushes, a (paint/adhesive) pool coating system etc. or any other equivalent means.

Second, for the solid medium 12 ablative layer (tape and foil—vinyl, Al, Ta, Mo, Cu, Zn, Tn, Pb . . . ) a reel (roll to roll) system is used (FIGS. 3 and 5). The solid ablative layer 12 is brought on coils 13, and placed on shafts 14. After each use of the WLSP process, a new section of the ablative medium or layer 12 is unrolled from the coil 13 so that it is positioned on the bottom side of the confining layer. In an alternative embodiment a similar solution could use flat sheets of foil instead of rolls.

In some embodiments an ablative layer 9 or 12 is not used and only the solid state confining layer 8 is applied prior to LSP/WLSP. This can be seen in cases where the effects of the ablative layer are not beneficial enough (e.g. shallower penetration depths are required).

The advantages of the methods according to the present invention are numerous. For example, the produced parts 6 have improved mechanical properties compared to parts built by standard SLM processes. Moreover, the produced parts 6 have improved fatigue life, compared to parts built by standard SLM processes (or many other processes). This is due to the high level and depth of induced compressive residual stress that is limiting crack propagation from the surface. In addition, the produced parts 6 have improved wear and corrosion resistance, compared to parts built by standard SLM processes. Next, the produced parts 6 may be selectively hardened throughout the volume of the part, especially addressing critical sections of an article with complex geometries that may create weaknesses. Furthermore, the produced parts 6 have a higher density compared to parts built by standard SLM processes. In addition, he produced parts 6 have a better surface quality compared to parts built by standard SLM processes.

Some embodiments of the invention and materials suggested for the confining/ablative layer 8/9 of the device in the present application are only illustrative examples and should not be construed in a limiting manner. According to additional aspects of the present invention, equivalent devices and method steps can be used to the ones described therein with corresponding results. The embodiments described herein may also be combined together. For example features of the LSP embodiment may be applied to the WLSP embodiment or inversely, WLSP features may be applied to the LSP embodiment. Also the methods described and claimed may be defined in terms of the product features and conversely, device/system features may be defined in terms of methods features, these definitions not being limiting and applicable equally to devices or methods.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A method for manufacturing an object comprising the steps of:
   forming layers by adding successive layers of powder material to form the object by selective laser melting (SLM) of the powder material to form solidified material;
   providing a multilayered solid state confining layer to the solidified material; and
   inducing plastic deformation and residual stress by a laser beam into the solidified material of the successive layers after the step of providing, to improve mechanical properties and a fatigue resistance of the object.

2. The method as defined in claim 1, wherein the step of inducing the plastic deformation and the residual stress include a Laser Shock Peening (LSP) step or a Warm Laser Shock Peening (WLSP) step.

3. The method as defined in claim 1, wherein the step of forming the layers further includes a step of treating the successive layers or portions of the successive layers with multiple lasers or LSP or WLSP treatments.

4. The method as defined in claim 2, wherein a same laser or different lasers are used for the SLM and the LSP or WLSP steps.

5. The method as defined in claim 2, wherein a same scanning head or different scanning heads are used for the SLM and the LSP or WLSP steps.

6. The method as defined in claim 2, wherein for guiding of the laser beam used for the LSP or WLSP step a horizontal 2-axes motion is used.

7. The method as defined in claim 2, wherein for guiding of the laser beam used for the LSP or WLSP step a tilting mirror is used.

8. The method as defined in claim 1, further comprising the step of:
heat treating the successive layers selectively.

9. The method as defined in claim 8, wherein the heat treating is performed by at least one of a laser, an infrared lamp, and a substrate preheating.

10. The method as defined in claim 1, wherein the step of providing a multilayered solid state confining layer further includes:
placing the multilayered solid state confining layer including a confining layer and an ablative layer over a portion of the solidified material to increase a stress wave and avoid material ablation.

11. The method as defined in claim 10, wherein the ablative layer is made of an ablative opaque layer material.

12. The method as defined in claim 1, wherein the step of providing a multilayered solid state confining layer further includes:
applying the multilayered solid state confining layer that is transparent to the laser beam to maximize a pressure of a shock wave and preventing the shock wave from rapidly expanding from a surface of the material, thus increasing a depth of shockwave penetration.

13. A system to carry out a selective laser melting (SLM) process, the system comprising:
a first laser;
a scanning head;
a powder deposition system including fresh powder;
a platform on which a part is built by the SLM process realized by the first laser;
a second laser;
a solid state confining layer transparent to laser, the solid state confining layer including two layers; and
an ablative layer for applying a laser shock peening (LSP) step to the part.

14. The system as defined in claim 13, wherein the ablative layer is a liquid layer or a solid layer.

15. The system as defined in claim 13, further comprising:
a heating unit to heat the part.

16. The system as defined in claim 13, wherein at least one of the layers of the solid state confining layer is an exchangeable consumable.

17. The system as defined in claim 16, wherein the exchangeable layer is a top part of the ablative layer.

18. The system as defined in claim 13, wherein the first laser and the second laser are the same laser working at a continuous mode for the selective laser melting (SLM) and at a pulse mode for the laser shock peening (LSP).

* * * * *